March 4, 1958     N. B. WILLIAMSON     2,825,574
CART FOR GOLF BAGS
Filed March 12, 1956     2 Sheets-Sheet 2
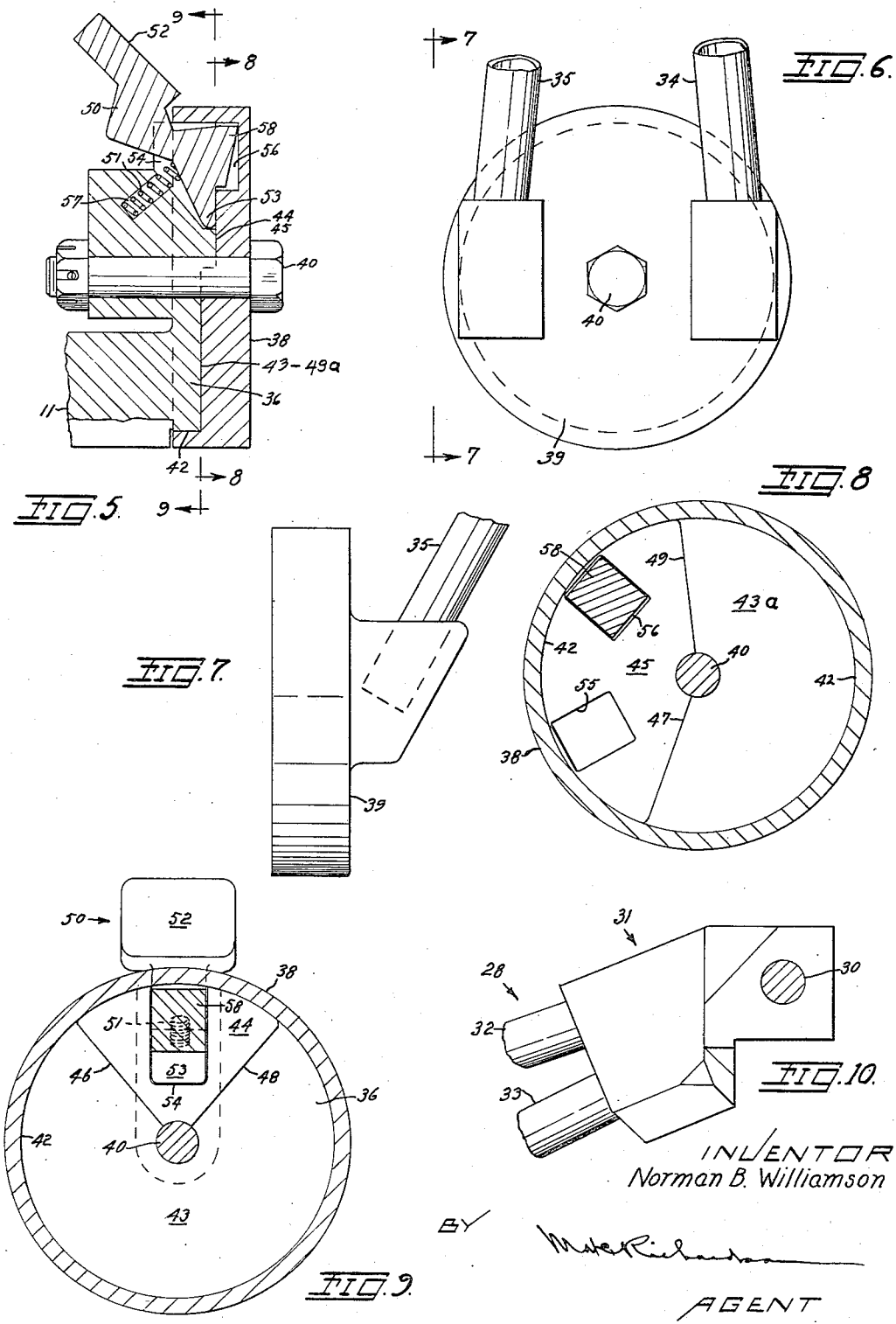
INVENTOR
Norman B. Williamson United States Patent Office 2,825,574
Patented Mar. 4, 1958

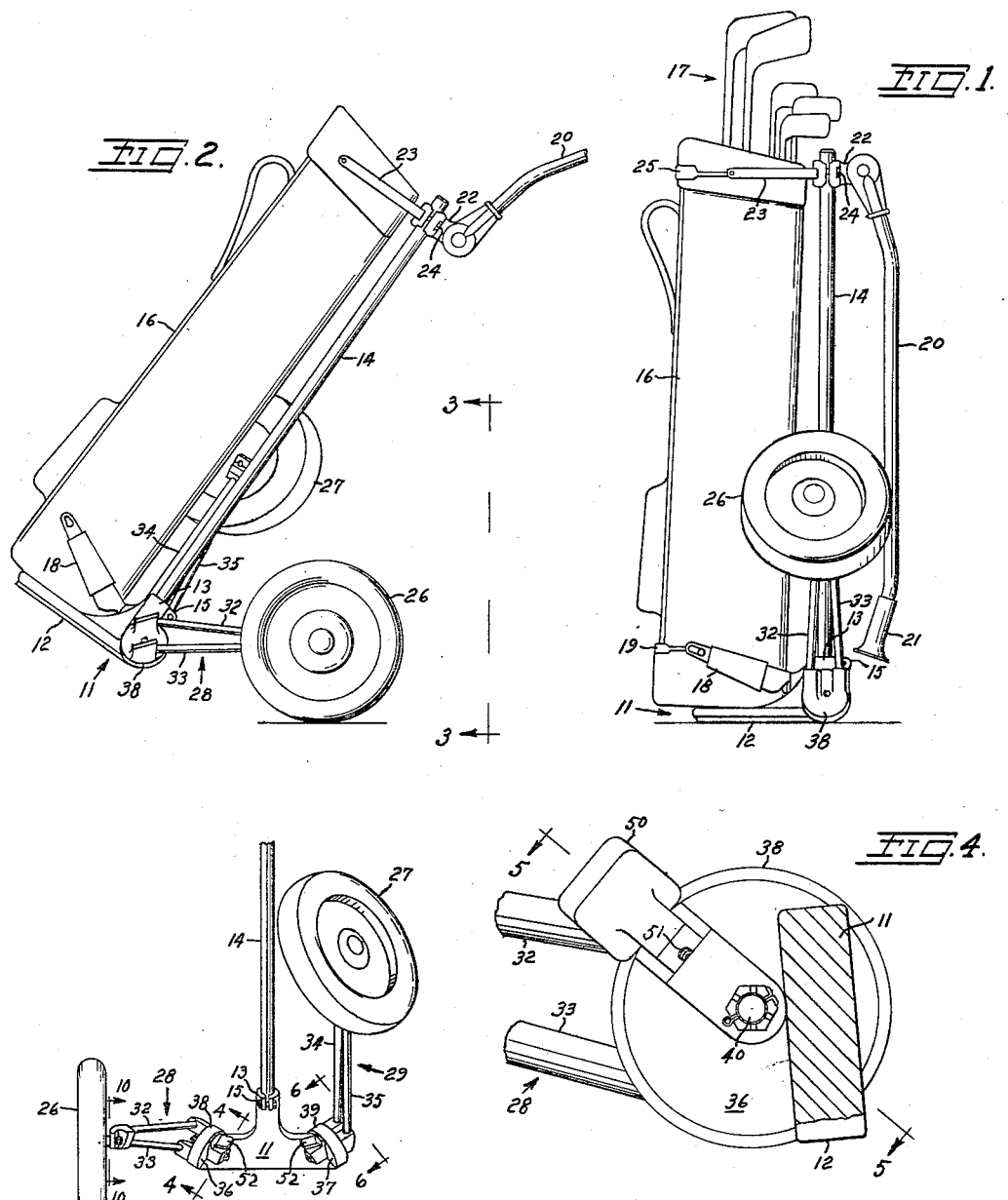

2,825,574

CART FOR GOLF BAGS

Norman B. Williamson, Portland, Oreg., assignor to Jarman-Williamson Company, Portland, Oreg.

Application March 12, 1956, Serial No. 571,004

1 Claim. (Cl. 280—38)

This invention relates generally to hand trucks and more particularly to that form of hand truck which has come to be known as a folding golf bag cart.

Reference is here made to my prior U. S. patents, No. 2,443,847 and No. 2,523,893 over which the present invention has the advantage of lower cost as well as novel features later to be explained.

It is the first object of this invention to provide such a cart which will be light in weight, rugged, and low in first cost.

It is a second object to provide such a cart having a base on which the folded cart can be stored in an upright position without other support.

It is a third object to provide such a cart with a simple tubular frame secured at one end to said base and to the other end of which a handle extension is positionably secured.

It is a fourth object to provide such a cart with a pair of wheel arms pivotally secured respectively to said base at the respective opposite transverse ends thereof.

It is a fifth object to provide such a cart in which the pivot axes of said wheel arms on said base are in a plane.

It is a sixth object to provide such a cart with a pair of wheels rotatably secured on the respective free ends of said wheel arms.

It is a seventh object to provide such a cart in which said wheel arms are pivotally rotatable about their pivot axes from a storage position in which said wheel arms extend upwardly from said base substantially parallel with said frame to a position of use in which said wheel arms diverge downwardly from said frame and laterally from each other.

It is an eighth object to provide such a cart in which said wheels are coaxial when said wheel arms are in their positions of use and diverge in the direction of said frame to lay against the golf bag carried on said cart when said wheel arms are in their storage position.

It is a ninth object to provide such a cart which utilizes the full length of its handle, its frame and one of its wheel arms in series resilience to isolate the free end of said handle from the road shock of the wheel rotatably secured to the free end of the wheel arm.

How these and other objects are attained is explained in the following description referring to the attached drawing in which Fig. 1 is a view in side elevation of the cart of this invention when supporting a bag of golf clubs in the folded storage position of the cart.

Fig. 2 is a fragmental side elevation of the cart in a partially unfolded position of use.

Fig. 3 is a fragmental rear elevation along the line 3—3 of Fig. 2.

Fig. 4 is a fragmental enlarged view along the line 4—4 of Fig. 3.

Fig. 5 is a view in section along the line 5—5 of Fig. 4.

Fig. 6 is a fragmental elevation along the line 6—6 of Fig. 3.

Fig. 7 is a fragmental elevation along the line 7—7 of Fig. 6.

Fig. 8 is a fragmental sectional view along the line 8—8 of Fig. 5.

Fig. 9 is a fragmental sectional view along the line 9—9 of Fig. 5.

Fig. 10 is a fragmental elevation along the line 10—10 of Fig. 3.

Like numerals of reference refer to like parts in the several figures of the drawings.

Referring now to the drawings the preferred form here shown in which the invention may be practiced is seen to be a foldable golf bag cart having a base 11 with a flat bottom 12 and formed with a receptacle 13 normal to flat bottom 12 and adapted to receive tubular frame 14 secured therein by clamp 15 as shown.

Golf bag 16 carrying golf clubs 17 rests on base 11 as shown and is laterally supported near its bottom by U-shaped support 18 secured to base 11. Bag 16 is secured in support 18 by rubber rope 19. Cart handle 20 finished at its free end with a plastic hand grip 21 is positionably secured at its other end to clamp 22 which together with U-shaped bag support 23 is secured to the upper end of frame 14 by bolts 24. Rubber rope 25 secures bag 16 in support 23.

Wheels 26 and 27 are of a well known design and have axially secured therein ball bearing supported stub axles 30 threaded at their free ends and secured in place in wheel arms 28, 29, respectively by engagement of the respective threaded ends of axles 30 with wheel ends 31 of wheel arms 28, 29, as typically shown in Fig. 10. Typically shown for wheel arm 28, tubular struts 32 and 33 have end 31 of arm 28 cast securely in place. Similarly tubular struts 34 and 35 have a similar wheel end 31 of wheel arm 29 cast thereon.

Formed on each of the transverse ends of base 11 is a flat ended cylindrical extension 36 or 37, each with an axial hole formed therethrough to receive pivot bolts 40 or 41 for the purpose of pivotally securing to the respective extensions 36 or 37 of base 11 the base ends 38 or 39 of wheel arms 28 or 29 respectively.

Outside and side views of base end 39 of wheel arm 29 are shown in Figs. 6 and 7 to be typical of the wheel arms 28 and 29 formed symmetrically about a plane through the axis of frame 14 and the centerline of base 11. As typical of the pivotal interaction of either of the base ends 36 or 37 with its respective wheel arm end 38 or 39 of wheel arms 28 or 29, Figs. 5, 8 and 9 show the interconnection of base end 36 with end 38 of wheel arm 28.

Basically pivot bolt 40 secures wheel arm end 38 of arm 28 to base end 36 of base 11 and arm end 38 rotates on base end 36 along cylindrical surfaces 42 and flat surfaces 43 and 43a. However sector shaped surface 44 is raised up from surface 43 of base end 36 between abutment faces 46 and 48 and sector shaped surface 45 is sunk into surface 43a of arm end 38 between abutment faces 47 and 49 thus limiting the rotation of the wheel arms from that of the storage position of the wheel with abutment faces 46, 47 in contact to that of the use position of the wheel with abutment faces 48, 49 in contact. In Fig. 3 wheel 26 is shown in the use position and wheel 27 is shown in the storage position.

To maintain the wheel arm in the selected position of storage or use, a detent 50 is provided to be biased towards a locked position by spring 51 and to be moved to an unlocked position by pressure of the user's foot on the exposed pedal end 52 of detent 50. In Fig. 5 detent 50 is shown in section to be rockable with or against the bias of spring 51 about its wedge shaped end 53 in a guiding slot 54 formed in part 36 and a pair of guiding slots 55 and 56 formed in part 38. When spring 51 is compressed into its guiding hole 57 formed in part 36 by pressure on pedal surface 52 of detent 50, key end 58 of detent 50 will be withdrawn from engagement with either slot 55 or 56 and arm end 28 can be rotated between its limit positions. If detent 50 is released when its key end 58 is alined with slot 56 then the wheel arm will be locked in the storage position. If detent 50 is released when its key end 58 is alined with slot 55 then the wheel arm will be locked in its position of use.

In storage as in Fig. 1, the wheels 26, 27 and wheel arms 28, 29 of the forms of my invention here described are in their storage positions and held there by key end 58 of detent 50 engaged in the respective wheel arm slots like 56 shown in Fig. 8. Handle 20 is folded downwardly about its pivot point on clamp 22 and the folded cart is stood upright on the bottom surface 12 of base 11.

When it is desired to use the cart with its clubs and bag, handle 20 is first adjusted to its use position and then the extending pedal end detents 50 are depressed to release wheel arms 28 and 29 for wheels 26, 27 to fall to the ground. Tilting the cart forward on the front toe of the golf bag will raise the cart base sufficiently for the detent key ends to fall into their use positions (like 55 Fig. 8) and the cart is ready for use.

Having thus recited some of the objects of this invention, illustrated and described a preferred form in which the inventions may be practiced and explained its operation, I claim:

A golf cart comprising an elongated vertical tubular frame secured at its lower end to a ground engaging horizontal base, a pair of laterally extending pivot pins secured to said base at opposite sides thereof, a pair of wheel arms, each of said arms being fixed at one end on a respective one of said pins for rotary movement thereabout, said arms having detent sockets formed therein, the respective sides of said base having detents movably carried thereon for engagement in respective ones of said sockets at selected relative angular positions about said pins of said base and said arms, a pair of wheel axles fixed respectively to the other ends of said arms and a pair of wheels carried respectively one each on one each of said pair of axles.

References Cited in the file of this patent

UNITED STATES PATENTS

| | | |
|---|---|---|
| 2,523,893 | Williamson | Sept. 26, 1950 |
| 2,635,893 | Johnson | Apr. 21, 1953 |
| 2,718,406 | Sawyer | Sept. 20, 1955 |
| 2,725,240 | Johnson | Nov. 29, 1955 |

FOREIGN PATENTS

| | | |
|---|---|---|
| 730,925 | Great Britain | June 1, 1955 |